United States Patent
Murata

(10) Patent No.: US 9,426,547 B2
(45) Date of Patent: Aug. 23, 2016

(54) PON SYSTEM, STATION SIDE DEVICE AND METHOD FOR OPERATING THE SAME, AND ACCESS CONTROL DEVICE

(75) Inventor: Hiroshi Murata, Osaka (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 97 days.

(21) Appl. No.: 14/240,425

(22) PCT Filed: Mar. 15, 2012

(86) PCT No.: PCT/JP2012/056677
§ 371 (c)(1),
(2), (4) Date: Feb. 24, 2014

(87) PCT Pub. No.: WO2013/031267
PCT Pub. Date: Mar. 7, 2013

(65) Prior Publication Data
US 2014/0212139 A1 Jul. 31, 2014

(30) Foreign Application Priority Data
Aug. 29, 2011 (JP) .................. 2011-186211

(51) Int. Cl.
*H04L 12/28* (2006.01)
*H04Q 11/00* (2006.01)

(52) U.S. Cl.
CPC ........ *H04Q 11/0067* (2013.01); *H04L 12/2861* (2013.01); *H04L 12/2869* (2013.01); *H04Q 2011/0081* (2013.01)

(58) Field of Classification Search
None
See application file for complete search history.

(56) References Cited

U.S. PATENT DOCUMENTS

| 8,019,220 B2 | 9/2011 | Ozaki |
| 8,542,994 B2 | 9/2013 | Murata |

FOREIGN PATENT DOCUMENTS

| JP | H08-8955 A | 1/1996 |
| JP | 2004-289780 A | 10/2004 |
| JP | 2006-148497 A | 6/2006 |
| JP | 2007/037063 A | 2/2007 |
| JP | 2007-174364 A | 7/2007 |

(Continued)

OTHER PUBLICATIONS

English translation of Office Action for Japanese Application No. 2011-186211, dispatch date Nov. 12, 2013.*

(Continued)

*Primary Examiner* — Darren E Wolf
(74) *Attorney, Agent, or Firm* — Drinker Biddle & Reath LLP

(57) ABSTRACT

The present invention relates to a station side device having a plurality of PON lines and connected thereto. A fallback mode where a partial access control unit is not allowed to communicate communication frames is performed by switching an upper switch and a lower switch in the manner shown in the following (a) and (b): (a) output destinations of downstream frames to the first and second PON lines and inputted to the upper switch are aggregated into a first access control unit, and output destinations of the downstream frames inputted from the first access control unit to the lower switch are distributed to first and second optical transmitting and receiving units and; and (b) output destinations of upstream frames inputted from the first and second optical transmitting and receiving units and to the lower switch are aggregated into the first access control unit.

10 Claims, 9 Drawing Sheets

(56) References Cited

FOREIGN PATENT DOCUMENTS

| | | |
|---|---|---|
| JP | 2007-199782 A | 8/2007 |
| JP | 2007-208579 A | 8/2007 |
| JP | 2007-243284 A | 9/2007 |
| JP | 2008-054278 A | 3/2008 |
| JP | 2008-072370 A | 3/2008 |
| JP | 2009-124629 A | 6/2009 |
| JP | 2011-146784 A | 7/2011 |

OTHER PUBLICATIONS

Office Action issued Jul. 28, 2015 is Japanese Patent Application No. 2014-096103 (2 pages) with an English Translation (2 pages).

* cited by examiner

PON SYSTEM, STATION SIDE DEVICE AND METHOD FOR OPERATING THE SAME, AND ACCESS CONTROL DEVICE

TECHNICAL FIELD

The present invention relates to a PON (Passive Optical Network) system in which a station side device and a plurality of customer side devices are connected to each other by communication lines of a tree structure, the station side device which is a component of the system, a method for operating the station side device, and an access control device.

BACKGROUND ART

A PON system is an optical communication system that performs optical splitting in a P2MP (Point to Multi Point) connection mode, with no electrical power. The PON system includes a station side device; a PON line of a tree structure composed of a single-core optical fiber network which is split with the station side device at the top; and a plurality of customer side devices connected to the ends of the split optical fibers, respectively (see, for example, Patent Literatures 1 to 3).

In the PON system, NRZ (Non-Return to Zero) optical signals obtained by directly or externally modulating a light source such as a semiconductor laser are transmitted, by which predetermined information is transmitted and received.

In such a PON system, downstream frames composed of optical signals transmitted from the station side device are transmitted to the customer side devices in broadcast form. Each customer side device receives a downstream frame destined therefor (also including the case of multicast) by referring to a logical link identifier (e.g., an LLID in the case of a PON specified in IEEE Std 802.3™-2008. In the following, it may be representatively described as LLID.) which is included in a preamble of the downstream frame and which is notified by the station side device upon discovery, and discards other downstream frames.

On the other hand, for upstream frames composed of optical signals sent out to the PON line from the customer side devices, in order to prevent collisions, the station side device performs multi-point access control in a time-division manner for each LLID. Therefore, the station side device receives the upstream optical signals from the customer side devices in a burst manner.

CITATION LIST

Patent Literature

Patent Literature 1: Japanese Unexamined Patent Publication No. 2004-289780
Patent Literature 2: Japanese Unexamined Patent Publication No. 2007-174364
Patent Literature 3: Japanese Unexamined Patent Publication No. 2007-243284

SUMMARY OF INVENTION

Technical Problem

A station side device in a PON system includes an access control unit (hereinafter, also referred to as an "access control device") that performs multiple access control of upstream frames in the PON section, based on an access control protocol. For example, in the case of PONS specified in IEEE Std 802.3™-2008 and IEEE Std 802.3av™-2009, MPCP (MultiPoint Control Protocol) corresponds to the access control protocol.

The access control device is normally configured by mounting a plurality of LSIs (Large Scale Integrated Circuits) on a control board. The access control device operates according to computer programs for a programmable logic circuit (Field-Programmable Gate Array: FPGA) and a programmable microprocessor (Micro-Processing Unit: MPU), which are stored in advance in a memory.

Therefore, to perform additions and changes of functions (hereinafter, collectively referred to as "changes, etc.") for the access control device, there is a need to update the computer programs executed by the logic circuit and the microprocessor.

However, computer program update operations normally include a procedure of resetting a processor of the access control device to their initial states and then restarting with functions having been subjected to changes. Thus, there is a problem that data transfer between an upper network and a PON line needs to be stopped during the update operations from the reset until the restart.

Communication interruption time associated with such an update is not so short as to be able to maintain the communication quality required for the telephone and the transmission of video signals. For example, the communication interruption time is normally a longer period of time than timeout time (for one second) specified in MPCP.

Hence, conventionally, to minimize damage where communication such as the telephone becomes unavailable, telecommunications carrier operators perform operations such as updating computer programs at the right timing during midnight hours where the traffic is relatively light. Thus, function changes for the access control device require a lot of time and trouble.

In addition, in the conventional station side -device, since the access control device is connected in a one-to-one correspondence to a PON-side optical transmitting and receiving unit, even when the traffic on the PON line is light and thus the amount of data transferred by the station side device is small, the access control device always needs to be in operation. Thus, there is a drawback that the power consumption of the access control device cannot be reduced.

In view of such conventional problems, a first object of the present invention is to allow a station side device having a plurality of PON lines connected thereto to perform fallback mode where upstream multiple access control for the plurality of PON lines is performed by an access control unit, the number of which is smaller than the number of the PON lines, and the remaining access control unit is not allowed to communicate communication frames.

In addition, a second object of the present invention is to allow performing an update to a computer program for an access control unit without stopping data transfer on the station side device.

Furthermore, a third object of the present invention is to allow reducing the power consumption of the access control units of the station side device.

(1) The present invention provides a station side device that configures a PON system with a plurality of customer side devices, the station side device including: a first optical transmitting and receiving unit connectable to a first PON line; a second optical transmitting and receiving unit connectable to a second PON line; a first access control unit that can perform normal line control and multiple-line control, the normal line control being upstream multiple access control for the first PON line, and the multiple-line control being the upstream multiple access control for the first and second PON lines; a second access control unit that can perform normal line control, the normal line control being the upstream multiple access control for the second PON line; an upper switch provided on an upper side of both of the access control units; a lower switch provided between both of the access control units and both of the optical transmitting and receiving units; and a fallback control unit that can switch both of the switches in a manner shown in following (a) and (b).

(a) Output destinations of downstream frames to the first and second PON lines inputted to the upper switch are aggregated into the first access control unit, and output destinations of the downstream frames inputted from the first access control unit to the lower switch are distributed to the first and second optical transmitting and receiving units.

(b) Output destinations of upstream frames inputted from the first and second optical transmitting and receiving units to the lower switch are aggregated into the first access control unit.

Solution to Problem

In the present specification, the "first access control unit" refers to an access control unit (an access control unit that can be placed in an "active" state which will be described later) capable of performing the multiple-line control where the access control unit performs upstream multiple access control for another second PON line simultaneously with upstream multiple access control for a first PON line normally managed thereby, and the "second access control unit" refers to an access control unit (an access control unit that can be placed in a "standby" state which will be described later) in which communication frames are not communicated anymore as a result of the first access control unit performing the multiple-line control.

According to the station side device of the present invention, when the fallback control unit switches both of the switches in the manner shown in the above-described (a) and (b), the first access control unit performs multiple-line control, and as a result, communication frames are not communicated anymore in the second access control unit.

Hence, the station side device having the first and second PON lines connected thereto can perform fallback mode where the plurality of PON lines are served by the first access control unit, the number of which is smaller than the number of the PON lines, and the remaining second access control unit is not allowed to communicate communication frames. Therefore, the first object is attained.

(2) In the station side device of the present invention, it is preferred that the fallback control unit can further switch both of the switches in a manner shown in following (c) and (d).

(c) Output destinations of downstream frames to the first and second PON lines inputted to the upper switch are distributed to the first and second access control units, and output destinations of the downstream frames inputted from the first and second access control units to the lower switch are set to the first and second optical transmitting and receiving units, respectively.

(d) Output destinations of upstream frames inputted from the first and second optical transmitting and receiving units to the lower switch are set to the first and second access control units, respectively.

In this case, when the fallback control unit switches both of the switches in the manner shown in the above-described (c) and (d), the first access control unit performs normal line control on the first PON line, and the second access control unit performs normal line control on the second PON line.

Hence, the station side device operated in fallback mode can be returned to normal mode where both of the first and second access control units perform normal line control.

(3) In the station side device of the present invention, the first access control unit has a management table that holds logical link identifiers for the first PON line and logical link identifiers for the second PON line such that values of the logical link identifiers do not overlap, and performs the multiple-line control using the logical link identifiers held in the management table.

The reason is as follows. Specifically, in the PON, customer side devices are identified by logical link identifiers. Thus, if logical link identifiers overlap between PON lines, then when multiple-line control is performed, appropriate upstream multiple access control cannot be performed.

Note that for a method for managing, by the first access control unit, logical link identifiers such that the values of the logical link identifiers do not overlap even in the case of multiple-line control, there is a method for setting logical link identifiers such that the first and second access control units always have different values of logical link identifiers, e.g., during a period during which the first and second access control units perform normal line control, the first and second access control units notify each other of their logical link identifiers, or the first access control unit uses odd numbers and the second access control unit uses even numbers.

Alternatively, there is another method in which when transitioning from a state in which each of the first and second access control units performs normal line control to a state (fallback state) in which only the first access control unit performs multiple-line control, the logical links for the second access control unit are disconnected temporarily, and the first access control unit establishes logical links again.

(4) On the other hand, in the PON, the station side device manages information such as MAC addresses and RTTs (Round Trip Times) for each logical link identifier. When those pieces of information are different, the station side device considers the customer side device as a different customer side device and thus disconnects the logical link temporarily and then redoes discovery.

In addition, in the PON, the station side device achieves time synchronization with the customer side device by describing a count value (time) of an internal clock as a time stamp at the time of transmission of a control frame. Therefore, when the difference between the time maintained by the customer side device and the time stamp value notified by the station side device has a predetermined value or more, the customer side device disconnects its logical link.

Hence, in the station side device of the present invention, just sharing of only the values of logical link identifiers by the first access control unit with the second access control unit ends up that, when the fallback control unit switches the operating mode of the station side device to fallback mode, all logical links of the customer side devices belonging to the second PON line are disconnected temporarily. Thus, there is a need to redo discovery for those customer side devices all over again. Accordingly, a period of time during which communication is unavailable increases.

Hence, to prevent the logical links from being automatically disconnected due to the switching to fallback mode, it is preferred that the first access control unit obtain information required to maintain the logical links from the second access control unit and hold the information in advance in the management table for each logical link identifier, and perform the multiple-line control using the held information.

By doing so, the first access control unit can grasp information (the above-described MAC addresses, RTTs, etc.) required to maintain the logical links, from the beginning of multiple-line control, enabling to prevent automatic disconnection of the logical links caused by the information being unavailable.

(5) and (6) Moreover, for the same reason, it is preferred that the first access control unit performs the multiple-line control using a clock that synchronizes with the second access control unit, and using a time stamp whose difference from a time stamp used by the second access control unit has a predetermined value or less.

In this case, the first access control unit uses a clock that synchronizes with the second access control unit, and uses a time stamp whose difference from a time stamp used by the second access control unit has a predetermined value or less. Thus, the time stamp notified by the first access control unit to the customer side devices belonging to the second PON line roughly matches that in the case of the second access control unit.

Therefore, automatic disconnection of the logical links can be prevented which is caused by the customer side devices which belong to the second PON line being notified of a time stamp out of a time stamp value range which is allowed around the time of switching to fallback mode.

Note that maintaining of substantially the same time stamp by the first and second access control units is not necessarily an essential technical feature, and thus, the first access control unit may only use a clock that synchronizes with the second access control unit. Even in this case, by adopting a rule that when different time stamps are notified by different access control units upon switching, the customer side devices do not disconnect their logical links, the logical links of the customer side devices can be maintained.

(7) Of course, the station side device of the present invention may allow disconnection of the logical links caused by the switching of both of the switches by the fallback control unit. In this case, it is preferred that the first and second access control units cancel registration of logical link identifiers whose control subject of the upstream multiple access control changes, around time of switching of both of the switches by the fallback control unit.

By doing so, compared to the case of performing the multiple-line control so as to prevent the logical links from being automatically disconnected due to the switching to the fallback mode, fallback mode can be relatively easily achieved.

(8) In the station side device of the present invention, it is preferred that in the multiple-line control, the first access control unit performs a registration sequence of the customer side devices such that an input source of upstream frames in the lower switch is fixed to either one of the first and second optical transmitting and receiving units for each discovery process.

In this case, even during a period during which the first access control unit performs multiple-line control, a new customer side device can be appropriately allowed to participate in the PON. In addition, the station side device can grasp which one of the first and second PON lines the customer side device having newly participated in the PON belongs to.

(9) Moreover, in the station side device of the present invention, it is preferred that the first and second access control units create only a grant for an allowed upstream frame whose transmission timing is before switching of both of the switches by the fallback control unit.

By doing so, an upstream transmission collision can be prevented which is caused by transmission of an upstream frame by the customer side device after switching both of the switches, with a grant allowed by the first or second access control unit before switching both of the switches.

(10) Further, in the station side device of the present invention, it is preferred that in the multiple-line control, the first access control unit schedules upstream frames allowed for customer side devices belonging to a same PON line, such that transmission timings of the upstream frames are consecutive.

In this case, compared to the case in which the first access control unit randomly schedules upstream frames without taking into account which PON line the customer side devices belong to, the number of switchings of the lower switch during a predetermined period of time can be reduced. Thus, even when the temporal overhead associated with switching of the lower switch is not small, the overall overhead can be suppressed to be relatively small.

(11) The present invention provides a method for operating a station side device having at least two PON lines connected thereto, by switching an operating mode of the station side device, wherein the switchable operating mode includes following (x) and (y):

(x) normal mode where a first access control unit performs upstream multiple access control for a first PON line, and a second access control unit performs the upstream multiple access control for a second PON line; and (y) fallback mode where the first access control unit performs multiple-line control and the second access control unit is not allowed to communicate a communication frame, the multiple-line control being the upstream multiple access control for the first and second PON lines.

According to the method of the present invention, the switchable operating mode of the station side device includes the above-described (x) and (y). Thus, the station side device having at least two PON lines connected thereto can perform fallback mode where the plurality of PON lines are served by the first access control unit, the number of which is smaller than the number of the PON lines, and the remaining second access control unit is not allowed to communicate communication frames. Therefore, the first object is attained.

(12) In the method of the present invention, it is preferred that during a period of the fallback mode, a change to a computer program for a programmable component included in the second access control unit and a restart after the change are performed.

Namely, in fallback mode, the first access control unit performs multiple-line control which is upstream multiple access control for the first and second PON lines. Thus, by performing the changes and restart of a computer program for the second access control unit during the period of the fallback mode, the computer program can be updated without stopping data transfer on the station side device. Therefore, the second object of the present invention is attained.

(13) In addition, in fallback mode, communication frames are not communicated in the second access control unit. Thus, in the method of the present invention, power supply to the second access control unit may be stopped or suppressed during a period of the fallback mode.

By doing so, compared to the case in which power is supplied to both of the first and second access control units as usual, the power consumption of the access control units of the station side device can be reduced. Therefore, the third object is attained.

(14) Meanwhile, in fallback mode, the first access control unit performs upstream multiple access control on a larger number of customer side devices than that in the case of normal mode. Thus, the communication band for the customer side devices decreases compared to the case of normal mode.

Therefore, in the method of the present invention, it is preferred that the fallback mode is performed during a time period where traffic on the first and second PON lines has a predetermined value or less. By doing so, a reduction in upstream bandwidth caused by the increase in the number of customer side devices controlled by the first access control unit can be suppressed as much as possible.

(15) An access control device of the present invention is a control device (which is the same as the above-described "access control unit") that can be suitably employed in the station side device of the present invention.

Namely, the present invention provides an access control device that performs upstream multiple access control, the access control device including: a management table that holds logical link identifiers for identifying customer side devices; and a PON control unit that performs the upstream multiple access control using the logical link identifiers held in the management table, wherein the PON control unit holds, in the management table, logical link identifiers for a first PON line and logical link identifiers for a second PON line such that values of the logical link identifiers do not overlap, and performs multiple-line control using the logical link identifiers held in the management table, the first PON line being normally managed by the access control device, the second PON line being normally managed by another access control device, and the multiple-line control being the upstream multiple access control for the first and second PON lines.

According to the access control device of the present invention, the PON control unit holds, in a management table, logical link identifiers for a first PON line normally managed thereby and logical link identifiers for a second PON line normally managed by another access control device, such that values of the logical link identifiers do not overlap, and performs multiple-line control which is upstream multiple access control for the first and second PON lines, using the logical link identifiers held in the management table. As a result, communication frames are not communicated anymore in another access control device contained in the station side device.

Hence, the station side device having a plurality of PON lines connected thereto can perform fallback mode where the access control device of the present invention is allowed to bear the plurality of PON lines, and the remaining another access control device is not allowed to communicate communication frames. Therefore, the first object is attained.

(16) In the access control device, a PON system of the present invention includes: a plurality of customer side devices connected to each of first and second PON lines; and a station side device that can perform a method for operating a station side device described in any of the above (11) to (14).

Hence, the PON system of the present invention provides the same functions and effects as those provided by the station side device described in any of the above (11) to (14).

Advantageous Effects of Invention

As described above, according to the present invention, upstream multiple access control for a plurality of PON lines is performed by an access control unit, the number of which is smaller than the number of the PON lines. Thus, fallback mode where the remaining access control unit is not allowed to communicate communication frames can be performed.

In addition, according to the present invention, in the fallback mode, by updating a computer program for an access control unit where communication frames are not communicated, the computer program for the access control unit can be updated without stopping data transfer on the station side device.

Furthermore, according to the present invention, in the fallback mode, power supply to an access control unit where communication frames are not communicated is stopped or suppressed. By this, the power consumption of the access control units of the station side device can be reduced.

DESCRIPTION OF EMBODIMENTS

An embodiment of the present invention will be described below with reference to the drawings.

[Connection Mode of a PON System]

Figure 1:
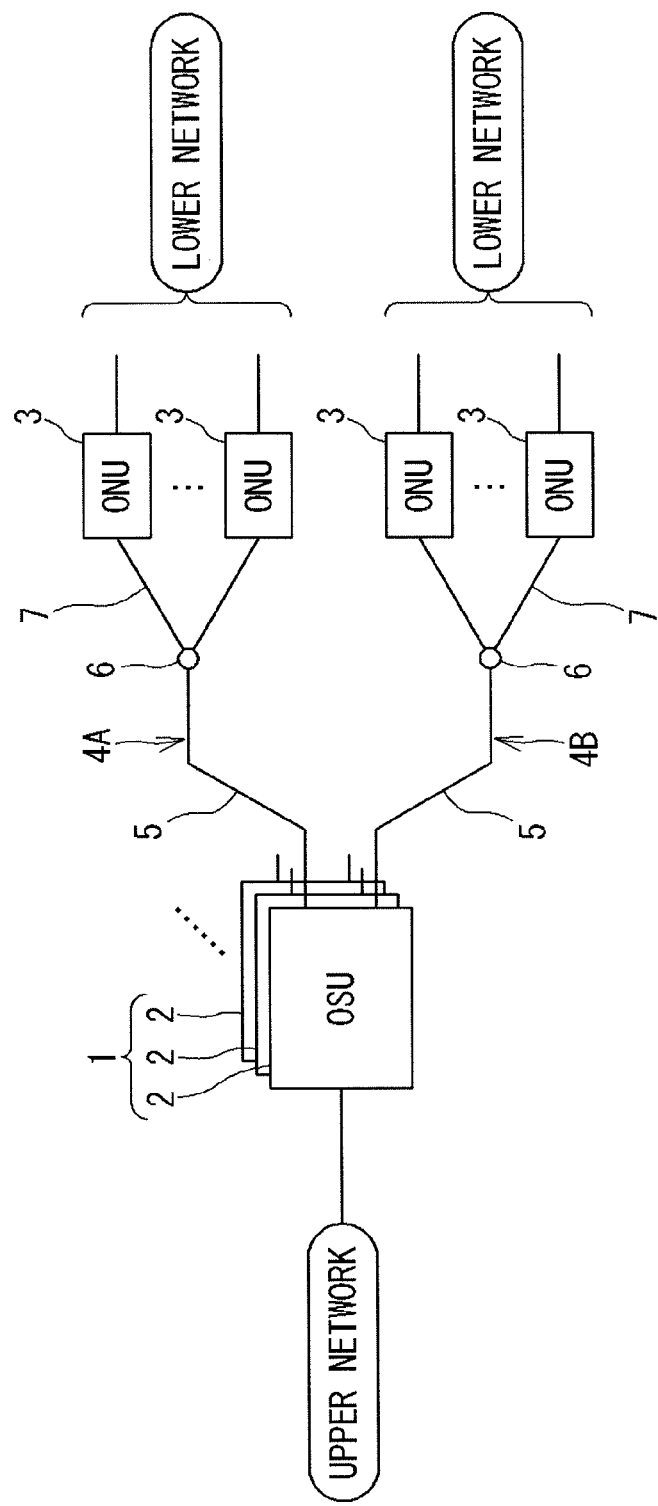
FIG. 1 is a diagram showing a connection mode of a PON system according to an embodiment of the present invention.

FIG. 1 is a diagram showing a connection mode of a PON system according to an embodiment of the present invention.

As shown in FIG. 1, the PON system of the present embodiment has a connection mode (topology) in which an optical line terminal (OLT) 1 on the telecommunications carrier side and optical network units (ONUs) 3 on the customer side are connected to each other by PON lines 4A and 4B of a tree structure.

The optical line terminal 1 on the carrier side is composed of an assembly of a plurality of optical subscriber units (OSU) 2 contained in one housing. The PON lines 4A and 4B are connected to each of the optical subscriber units 2.

In the following, in the present embodiment, each of the optical subscriber units 2 or the optical line terminal 1 which is an assembly thereof is referred to as the "station side device", and the optical network units 3 on the customer side which are connected to the station side device by the PON lines 4A and 4B are referred to as the "customer side devices". In addition, the "station side device" may be abbreviated as "OSU" or "OLT", and the "customer side device" may be abbreviated as "ONU".

The two-channel PON lines 4A and 4B are connected to the station side device 2. Each of the PON lines 4A and 4B has a single-core optical fiber 5 connected to the station side device 2; an optical coupler 6 which is a passive optical branch node; and single-core optical fibers 7 split from the optical coupler 6.

The optical fibers 7 are split in a predetermined number of splits (e.g., 32 or 64 splits) from the optical coupler 6. Optical network units 3 are connected to the ends of the optical fibers 7, respectively. In addition, the upper side of the station side device 2 (on the left in FIG. 1) is connected to an upper network, and the lower side of each customer side device 3 (on the right in FIG. 1) is connected to a lower network.

For a transmission scheme for the PON lines 4A and 4B, 10G-EPON where the upstream and downstream transmission rates are 10 G (the baud rate is 10.3125 Gbps), GE-PON where the upstream and downstream transmission rates are 1 G (the baud rate is 1.25 Gbps), or asymmetric 10G-EPON where the downstream transmission rate is 10 G and the upstream transmission rate is 1 G can be adopted.

Hence, the station side device 2 supports both 1 G and 10 G transmission rates, and each customer side device 3 is composed of a 1 G ONU, a 10 G asymmetric ONU, or a 10 G symmetric ONU.

[Configuration of the Station Side Device]

Figure 2:
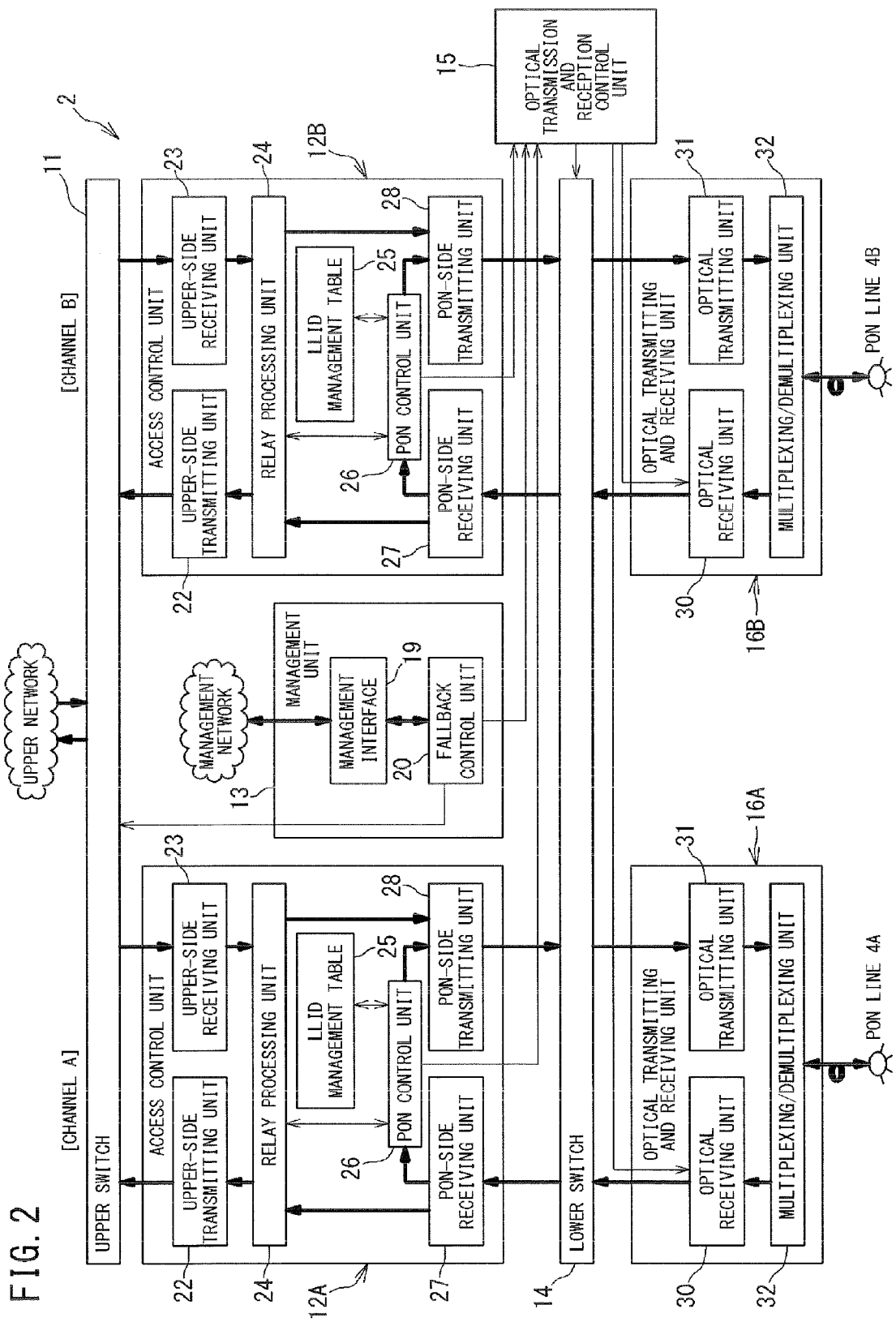
FIG. 2 is a block diagram showing a configuration of a station side device.

FIG. 2 is a block diagram showing a configuration of the station side device 2.

As shown in FIG. 2, the station side device 2 includes an upper switch 11, access control units 12A and 12B, a management unit 13, a lower switch 14, an optical transmission and reception control unit 15, and optical transmitting and receiving units 16A and 16B in this order from the upper side (upper side of FIG. 2) to the lower side.

The station side device 2 of the present embodiment controls the two-channel PON lines 4A and 4B according to MPCP. To do so, the station side device 2 includes the two optical transmitting and receiving units 16A and 16B to which the PON lines 4A and 4B are connected respectively; and the two access control units 12A and 12B.

Note that in the following, as the expressions for distinguishing between channels for the PON lines 4A and 4B, the access control units 12A and 12B, and the optical transmitting and receiving units 16A and 16B, "channel A" and "channel B" may be used.

The upper switch 11 is composed of an L2 switch connected to the upper side of the access control units 12A and 12B. The upper switch 11 has the function of multiplexing upstream frames sent out from the access control units 12A and 12B and relaying the multiplexed upstream frame to the upper network, and separating downstream frames from the upper network to the PON lines 4A and 4B if the frames are unicast frames or copying the frames where necessary if the frames are not unicast frames, and then relaying the frames to the access control units 12A and 12B.

Note that the upper switch 11 can also allow downstream frames from the upper network to return to the upper network, and allow upstream frames from the access control units 12A and 12B to return to the access control units 12A and 12B.

The management unit 13 performs management of the station side device 2 and management of the customer side devices 3 through the access control units 12A and 12B. The management unit 13 includes a management interface 19 and a fallback control unit 20.

The management interface 19 is connected to a management network, and can receive instructions from the telecommunications carrier which is the operator through the network.

Note that although in the example of FIG. 2 the management network is a different network than the upper network, they may be the same network.

The fallback control unit 20 performs switching of the upper switch 11 and switching of the lower switch 14 through the optical transmission and reception control unit 15, based on an input signal from the management interface 19, the details of which will be described later.

The lower switch 14 is connected to the PON side (lower side of FIG. 2) of the access control units 12A and 12B. The lower switch 14 is composed of an L1 switch connected to the upper side of the optical transmitting and receiving units 16A and 16B. The lower switch 14 has the function of switching the routes of electrical signals between the access control units 12A and 12B and the optical transmitting and receiving units 16A and 16B, at the physical layer level.

[Configurations of the Access Control Units and the Optical Transmitting and Receiving Units]

The access control units 12A and 12B and the optical transmitting and receiving units 16A and 16B of the present embodiment have the same configurations and the same functions between the channel A and the channel B. Hence, in the following, mainly, taking the channel A as an example, the configurations and the functions will be described.

The access control unit 12A is composed of a control device configured by mounting a plurality of LSIs on a control board, and includes a programmable logic circuit (FPGA) and a programmable microprocessor (MPU). Computer programs stored in a memory, etc., of the access control unit 12A contain code which is written, for example, in hardware description languages such as VHDL and Verilog for FPGA circuit design and in C language defining the processing content performed by the MPU, and which is subjected to processes such as compilation according to the structures of devices such as the FPGA and the MPU.

As shown in FIG. 2, the access control unit 12A includes an upper-side transmitting unit 22, an upper-side receiving unit 23, a relay processing unit 24, an LLID management table 25, a PON control unit 26, a PON-side receiving unit 27, and a PON-side transmitting unit 28 in this order from the upper side to the lower side.

A downstream frame inputted from the upper switch 11 is received by the upper-side receiving unit 23 and sent to the relay processing unit 24. The relay processing unit 24 sends out the downstream frame to the PON-side transmitting unit 28. The PON-side transmitting unit 28 inputs the downstream frame to the lower switch 14.

An upstream frame inputted from the lower switch 14 is received by the PON-side receiving unit 27 and sent to the relay processing unit 24 or the PON control unit 26.

When the upstream frame is a data frame, the PON-side receiving unit 27 passes the frame to the relay processing unit 24. When the upstream frame is a control frame such as an MPCP frame or an OAM frame, the PON-side receiving unit 27 passes the frame to the PON control unit 26. The relay processing unit 24 sends out the data frame to the upper-side transmitting unit 22. The upper-side transmitting unit inputs the data frame to the upper switch 11.

The PON control unit 26 performs predetermined processes according to the properties of the control frame received from the PON-side receiving unit 27.

For example, when the received control frame is a REGISTER REQ from a customer side device 3, which is a response to a discovery GATE broadcast by the PON control unit 26 to the PON line 4A, 4B, the PON control unit 26 determines an LLID for the customer side device 3, and creates a REGISTER in which the value of the determined LLID is described, and then allows the PON-side transmitting unit 28 to downstream transmit the REGISTER.

Alternatively, when the received control frame is a REPORT from a customer side device 3 for a normal GATE (grant) transmitted by the PON control unit 26, the PON control unit 26 performs upstream dynamic bandwidth allocation using a predetermined algorithm, according to a required transmission amount which is described in the REPORT.

Then, the PON control unit 26 creates a grant destined for a predetermined LLID, in which an allowed transmission amount determined as a result of the dynamic bandwidth allocation, and upstream transmission timing are described. The PON control unit 26 then allows the PON-side transmitting unit 28 to downstream transmit the grant.

The PON control unit 26 also manages the LLID management table (hereafter, also simply referred to as the "management table") 25. In the management table 25, LLIDs for identifying customer side devices are included in entries. In addition, the PON control unit 26 holds, for each LLID entry, information required to maintain logical links. The required information includes, for example, the following information, but is not limited thereto:

1) Type information of the PON lines 4A and 4B

This identification information is information indicating to which one of the channel A and the channel B the ONU belongs.

2) Type information of the ONU

This type information is information indicating whether the ONU is a 1 G ONU, a 10 G asymmetric ONU, or a 10 G symmetric ONU.

3) MAC address of the ONU

4) RTT information of the ONU

5) QoS parameters

The parameters are parameters for defining priority class, minimum guaranteed bandwidth, and maximum allowed bandwidth which are set for the ONU.

6) VLAN mode in the upper network

In the present embodiment, the PON control units 26 for the channel A and the channel B can communicate with each other through the relay processing units 24, the upper-side transmitting and receiving units 22 and 23, and the upper switch 11 or through a control line which is not shown.

The PON control unit 26 for the channel A determines, through the above-described communication, LLIDs used thereby such that the values of the LLIDs do not overlap the values of LLIDs used by the PON control unit 26 for the channel B. Then, the PON control unit 26 for the channel A holds the LLIDs used by both of the channel A and the channel B and the above-described required information for the LLIDs in the management table 25. Note, however, that as will be described later, in the case of implementation of allowance for temporary disconnection of the logical links for the channel B at the time of a transition to fallback mode, such a determination is not necessary.

In addition, for a method for notifying each other of their LLIDs, each time a logical link is established or disconnected, the logical link may be notified, or LLIDs may be notified all at once before switching to an operating mode related to fallback. Note that the uniqueness of LLIDs between the channel A and the channel B can be secured not only by a method in which the PON control units 26 for the channel A and the channel B notify each other of their LLIDs, but also by a method in which the numerical value ranges of LLIDs used by the PON control units 26 for the channel A and the channel B are separated in advance.

Specifically, for example, the number spaces of LLIDs are separated by using odd numbers for the channel A and using even numbers for the channel B, or by using values incremented from 0 for the channel A and using values decremented from a predetermined value for the channel B. By this, overlapping of LLIDs used for the channel A and the channel B can be prevented.

The PON control units 26 for the channel A and the channel B operate by the same clock generator (not shown) provided in the station side device 2. Times (time stamps) counted by the clock generator are also grasped by the PON control units 26 for the channel A and the channel B through the above-described communication.

The PON control unit 26 for the channel A compares a time stamp notified by the PON control unit 26 for the channel B with its PON counter. The PON control unit 26 for the channel A determines whether the time different therebetwen has a predetermined value (e.g., 128 ns) or less. If exceeding the predetermined value, the PON control unit 26 for the channel A synchronizes its counter with the channel B, or provides notification to synchronize with the counter on the channel B side.

The optical transmitting and receiving unit 16A is composed of a known optical transceiver, and includes therein an optical receiving unit 30, an optical transmitting unit 31, and a multiplexing/demultiplexing unit 32. The optical receiving unit 30 is composed of a light-receiving device such as an avalanche photodiode. The optical transmitting unit 31 is composed of a light-emitting device such as a laser diode.

An upstream optical signal from the PON line 4A is received by the optical receiving unit 30 through the multiplexing/demultiplexing unit 32. The optical receiving unit 30 converts the received upstream optical signal into an electrical signal, and inputs the electrical signal to the lower switch 14. A downstream electrical signal from the lower switch 14 is converted by the optical transmitting unit 31 into an optical signal. The downstream optical signal is sent out to the PON line 4A through the multiplexing/demultiplexing unit 32.

The fallback control unit 20 outputs a control signal for switching the switches, to the upper switch 11 and the optical transmission and reception control unit 15, based on an instruction from the operator which is received via the management network.

In addition, the optical transmission and reception control unit 15 performs switching of the lower switch 14 and reception control for the optical receiving unit 30 in the optical transmitting and receiving unit 16A, 16B, based on the control signal from the fallback control unit 20 and a control signal from the PON control unit 26 for the channel A and the channel B. The reception control is control to adjust the reception conditions of the optical receiving unit 30 (e.g., the selection, reset, etc., of a reception amplifier circuit, a clock recovery circuit, and a decoder circuit according to the transmission rate) in accordance with the next upstream burst reception.

[Switch Control by the Fallback Control Unit]

Figure 3:
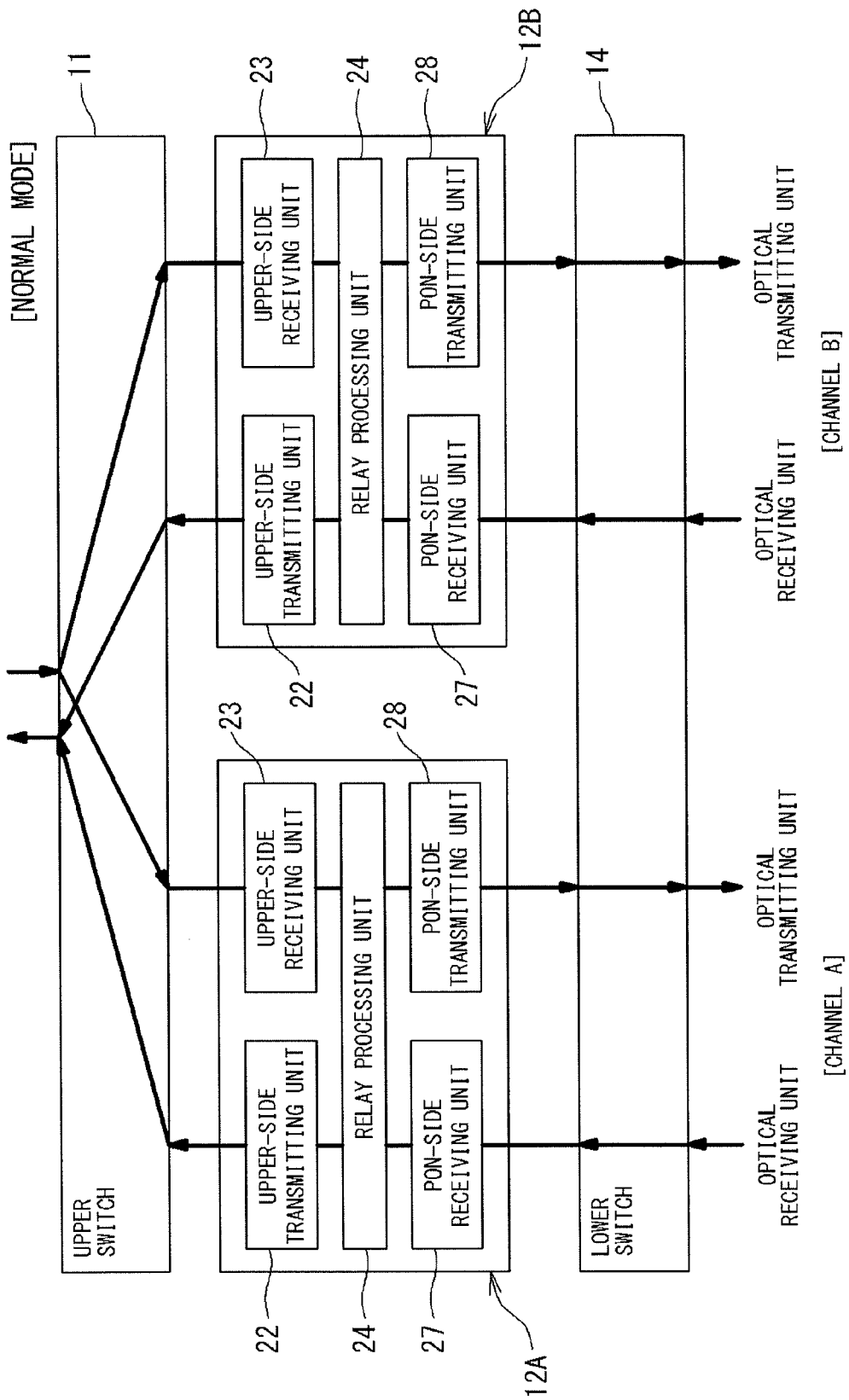
FIG. 3 is a diagram showing the flow of communication frames in normal mode.
Figure 4:
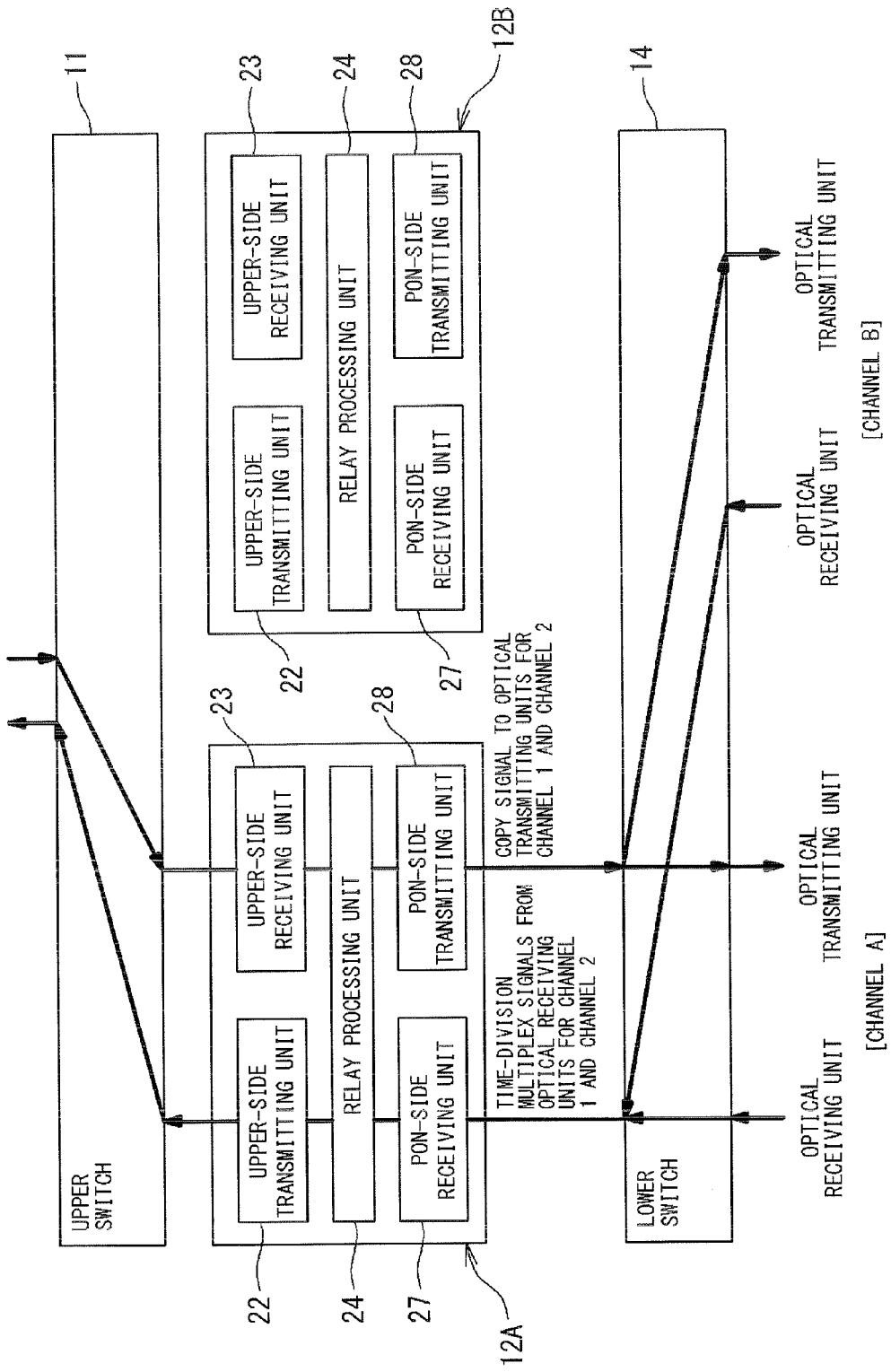
FIG. 4 is a diagram showing the flow of communication frames in fallback mode for when access control is aggregated into the channel A side.
Figure 5:
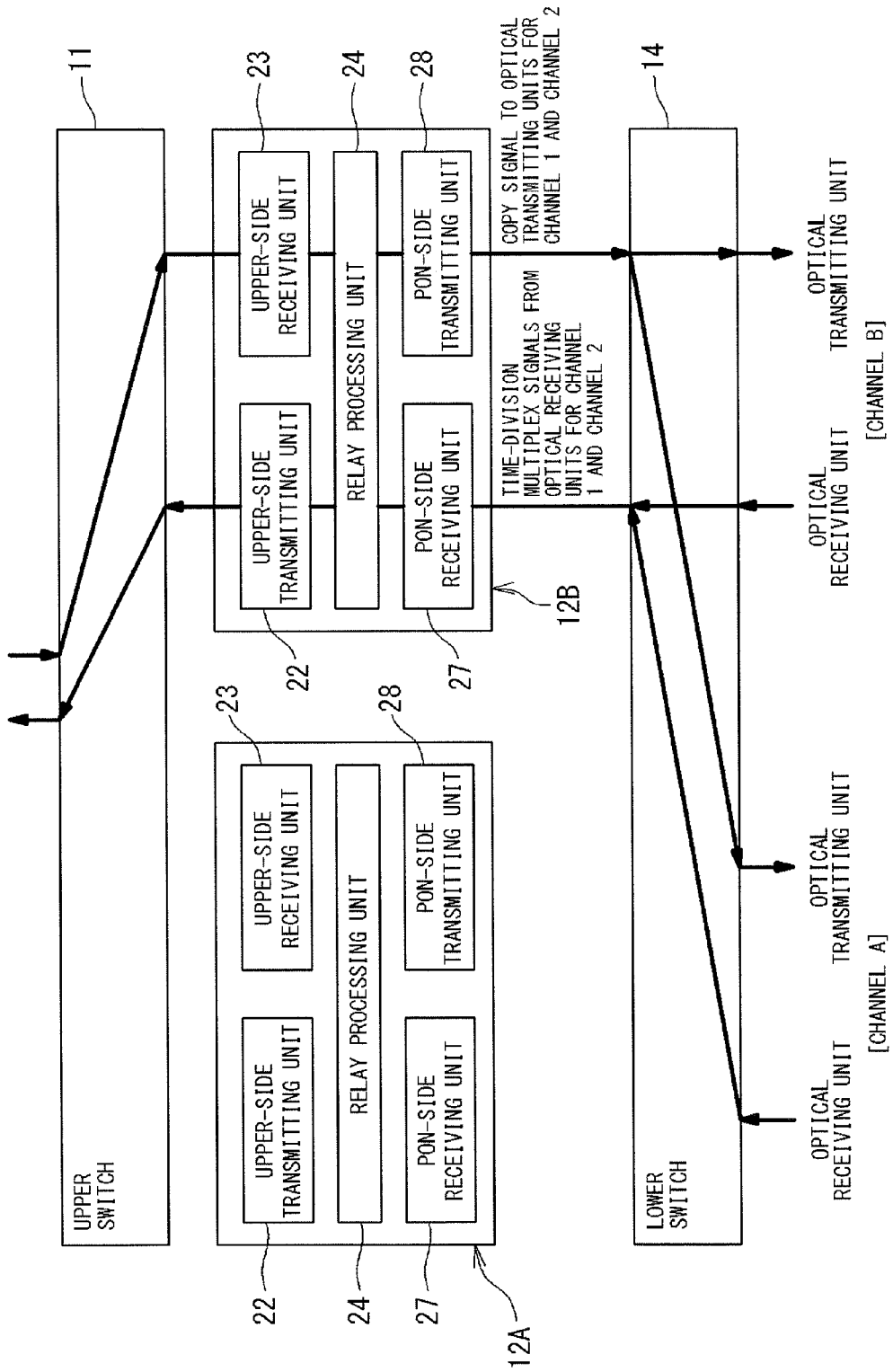
FIG. 5 is a diagram showing the flow of communication frames in fallback mode for when access control is aggregated into the channel B side.

FIG. 3 is a diagram showing the flow of communication frames in normal mode. In addition, FIG. 4 is a diagram showing the flow of communication frames in fallback mode for when access control is aggregated into the channel A side. FIG. 5 is a diagram showing the flow of communication frames in fallback mode for when access control is aggregated into the channel B side.

Note that although in FIGS. 3 to 5 an arrow indicating the connection between the upper switch 11 and the upper network is drawn using a single line, it does not mean that there is one physical connection. Note also that it does not mean either that there is one connection destination for physical connection, and there may be a plurality of physical connections from the upper switch 11 to the upper network, and the connection destination may include a plurality of upper devices.

With reference to FIGS. 3 to 5, the details of switch control performed by the fallback control unit 20 will be described below.

When an instruction received from the management interface 19 is "normal mode", the fallback control unit 20 sets the routes of the two switches 11 and 14 in the manner shown in FIG. 3. The setting of the routes will be described separately for an upstream frame and a downstream frame below.

S1) Output destinations of downstream frames to the PON lines 4A and 4B for the channel A and the channel B which are inputted to the upper switch 11 are distributed to the access control units 12A and 12B for the channel A and the channel B.

Note that the output destinations in this case are determined based on information included in the downstream frames, e.g., VLAN numbers, destination MAC addresses, etc. When the downstream frames to the PON lines 4A and 4B for the channel A and the channel B are unicast frames, the frames are transferred to either one of the PON lines 4A and 4B for the channel A and the channel B. When the downstream frames are not unicast frames, the frames are transferred to either one of the PON lines 4A and 4B, or are transferred to both of the PON lines 4A and 4B for the channel A and the channel B if necessary.

S2) Output destinations of the downstream frames inputted from the access control units 12A and 12B for the channel A and the channel B to the lower switch 14 are set to the optical transmitting and receiving units 16A and 16B for the channel A and the channel B, respectively.

S3) Output destinations of upstream frames inputted from the optical transmitting and receiving units 16A and 16B for the channel A and the channel B to the lower switch 14 are set to the access control units 12A and 12B for the channel A and the channel B, respectively.

As such, in normal mode, the access control unit 12A, 12B and the optical transmitting and receiving unit 16A, 16B for the same channel A, B are connected in a one-to-one correspondence to each other for both upstream and downstream transmissions.

Therefore, in this normal mode, the access control unit 12A for the channel A performs upstream multiple access control for the one PON line 4A which is normally managed thereby (hereinafter, referred to as "normal line control"). Likewise, the access control unit 12B for the channel B also performs normal line control which is upstream multiple access control for the one PON line 4B which is normally managed thereby.

When an instruction received from the management interface 19 is "fallback mode" where access control is aggregated into the channel A side, the fallback control unit 20 sets the routes of the two switches 11 and 14 in the manner shown in FIG. 4. The setting of the routes will be described separately for an upstream frame and a downstream frame below.

S4) Output destinations of downstream frames to the PON lines 4A and 4B for the channel A and the channel B which are inputted to the upper switch 11 are aggregated into the access control unit 12A for the channel A.

S5) Output destinations of the downstream frames inputted from the access control unit 12A for the channel A to the lower switch 14 are distributed to the optical transmitting and receiving units 16A and 16B for the channel A and the channel B.

S6) Output destinations of upstream frames inputted from the optical transmitting and receiving units 16A and 16B for the channel A and the channel B to the lower switch 14 are aggregated into the access control unit 12A for the channel A by performing time-division multiplexing control on the lower switch 14.

More specifically, when the access control unit 12A where data is communicated in fallback mode is defined as "active" and the access control unit 12B where data is not communicated in fallback mode is defined as "standby", the lower switch 14 copies downstream frames received from the PON-side transmitting unit 28 in the active access control unit 12A, and inputs the copied downstream frames to the optical transmitting units 31 in the optical transmitting and receiving units 16A and 16B for the channels A and B.

In addition, the lower switch 14 time-division multiplexes upstream frames from the optical receiving units 30 in the optical transmitting and receiving units 16A and 16B for the channels A and B, and inputs the time-division multiplexed upstream frame to the PON-side receiving unit 27 in the active access control unit 12A.

At this time, the PON control unit 26 in the active access control unit 12A instructs the optical transmission and reception control unit 15 for switching timing, based on transmission timing granted thereby to the customer side devices 3, so that burst signals in the upstream direction received from the PON lines 4A and 4B through the optical transmitting and receiving units 16A and 16B do not suffer from loss in the lower switch 14.

As such, in the fallback mode of FIG. 4, by the fallback control unit 20 controlling the two switches 11 and 14 in the above-described manner, the active access control unit 12A performs upstream multiple access control for the PON lines 4A and 4B for both of the channels A and B (hereinafter, referred to as "multiple-line control").

As a result, upstream and downstream frames are not inputted to the standby access control unit 12B from both of the switches 11 and 14. Thus, the standby access control unit 12B is placed in a non-communication state where communication frames are not communicated.

In addition, when an instruction received from the management interface 19 is "fallback mode" where access control is aggregated into the channel B side, the fallback control unit 20 sets the routes of the two switches 11 and 14 in the manner shown in FIG. 5. The setting of the routes will be described separately for an upstream frame and a downstream frame below.

S7) Output destinations of downstream frames to the PON lines 4A and 4B for the channel A and the channel B which are inputted to the upper switch 11 are aggregated into the access control unit 12B for the channel B.

S8) Output destinations of the downstream frames inputted from the access control unit 12B for the channel B to the lower switch 14 are distributed to the optical transmitting and receiving units 16A and 16B for the channel A and the channel B.

S9) Output destinations of upstream frames inputted from the optical transmitting and receiving units 16A and 16B for the channel A and the channel B to the lower switch 14 are aggregated into the access control unit 12B for the channel B by performing time-division multiplexing control on the lower switch 14.

Therefore, in the fallback mode of FIG. 5, inversely to the fallback mode of FIG. 4, the access control unit 12B for the channel B becomes active to perform multiple-line control on the PON lines 4A and 4B for both of the channels A and B. As a result, the access control unit 12A for the channel A becomes standby and thus is placed in a non-communication state where communication frames are not communicated.

[Method for Operating the Station Side Device]

As such, in the present embodiment, according to an instruction from the operator, the station side device 2 can be allowed to perform fallback mode where either one of the access control units 12A and 12B performs multiple-line control where the access control unit performs access control of the PON lines 4A and 4B for both of the channels A and B, and the other one of the access control units 12A and 12B is not allowed to communicate communication frames.

Therefore, for example, the operator of the PON system can perform, during the period of the fallback mode, changes to computer programs and a restart after the changes for programmable components such as the FPGA and the MPU included in the access control unit 12A, 12B having become standby. Note that the "changes" to the computer programs include corrections, additions, deletions, etc., of the programs.

In this case, in fallback mode, the active access control unit 12A, 12B performs multiple-line control for the PON lines 4A and 4B for the channel A and the channel B. Thus, by performing the changes and restart of computer programs for the standby access control unit 12A, 12B during the period of the fallback mode, the computer programs can be updated without stopping data transfer on the station side device 2.

For another method for operating the station side device, during the period of fallback mode, power supply to the standby access control units 12A and 12B may be stopped or suppressed.

In this case, compared to the case in which power is supplied to both of the access control units 12A and 12B for the channels A and B as usual, the power consumption of the access control units 12A and 12B of the station side device 2 can be reduced.

Note that in fallback mode the active access control unit 12A, 12B performs upstream multiple access control on a larger number of customer side devices 3 than that in the case of normal mode, and thus, the communication band for the customer side devices 3 decreases compared to the case of normal mode.

Hence, it is preferred that a time period during which fallback mode is performed be, for example, midnight hours where the traffic on the PON lines 4A and 4B has a predetermined value or less. In this case, the influence of the reduction in communication band per customer side device 3 which is caused by the increase in the number of customer side devices 3 controlled by the active access control unit 12A, 12B can be reduced.

In the station side device 2 of the present embodiment, as described above, the PON control units 26 in the access control units 12A and 12B manage LLIDs such that the values of the LLIDs do not overlap between the two channels A and B, and share information required to maintain logical links, for each LLID.

In addition, upon performing upstream multiple access control, the PON control units 26 in the access control units 12A and 12B achieve clock synchronization using the same clock generator, and achieve time synchronization such that the difference between their time stamps has a predetermined value or less.

Therefore, in the station side device 2 of the present embodiment, even if the control subject of upstream multiple access control based on MPCP is changed due to the switching from normal mode to fallback mode or inversely the switching from fallback mode to normal mode, the logical links of the customer side devices 3 belonging to the PON lines 4A and 4B for both of the channels A and B are maintained.

Hence, there is an advantage in being able to prevent an increase in a period of time during which communication is unavailable, which is caused by automatic disconnection of LLIDs for every mode switching.

[First Variant]

In the above-described embodiment, an implementation may allow logical links to be automatically disconnected by the switching of the operating mode of the station side device 2 which is performed by the fallback control unit 20 switching the routes of both of the switches 11 and 14.

In the case of such an implementation, however, it is preferred that each of the PON control units 26 in the access control units 12A and 12B for the channels A and B cancel the registration of LLIDs whose control subject of upstream multiple access control changes, around the time of switching of both of the switches 11 and 14 by the fallback control unit 20.

For example, when the operating mode of the station side device 2 is switched from normal mode to fallback mode where the channel A becomes active and the channel B becomes standby, the PON control unit 26 in the access control unit 12B for the channel B uniformly transmits DEREGISTERs to all customer side devices 3 belonging to the PON line 4B, regardless of whether DEREGISTER REQs are received from the customer side devices 3 belonging to the PON line 4B.

By doing so, after the operating mode of the station side device 2 is switched to fallback mode, the customer side devices 3 belonging to the PON line 4B make REGISTER REQs to the PON control unit 26 in the access control unit 12A. In response to the REQs, the PON control unit 26 in the access control unit 12A assigns new LLIDs to the customer side devices 3 belonging to the PON line 4B. Thus, it becomes unnecessary to manage LLIDs used by the PON control units 26 for the channels A and B such that the values of the LLIDs do not overlap, before the operating mode of the station side device 2 is switched to fallback mode.

Accordingly, fallback mode can be relatively easily achieved.

[Second Variant]

In the above-described embodiment, for a method for registering a customer side device 3 by the active access control unit 12A, 12B, it is preferred that during the period of execution of multiple-line control, the input source of upstream frames in the lower switch 14 be fixed to either one of the optical transmitting and receiving units 16A and 16B for the channel A and the channel B, for each discovery process, and a registration sequence of a customer side device 3 be performed in that fixed state.

The reason is as follows. Specifically, a registration sequence of a customer side device 3 is performed by the following procedure in which control frames are exchanged between the station side device 2 and the customer side device 3.

1) The station side device 2 broadcasts discovery GATEs.

2) The customer side device 3 sends back a REGISTER REQ to the station side device 2.

3) The station side device 2 transmits a REGISTER in which an LLID is described, to the customer side device 3.

4) The customer side device 3 sends back a REGISTER ACK to the station side device 2.

Therefore, for example, when the PON control unit 26 in the access control unit 12A for the channel A is the subject of the above-described registration sequence, if the input source of upstream frames in the lower switch 14 is switched in the middle of the registration sequence, then the PON control unit 26 in the access control unit 12A cannot receive responses (a REGISTER REQ and a REGISTER ACK) from the customer side device 3. Accordingly, the registration sequence of the customer side device 3 cannot be appropriately performed.

In this regard, when a registration sequence is performed such that the optical transmitting and receiving unit 16A, 16B is fixed for each discovery process, the same access control unit 12A, 12B can appropriately perform the procedure of the registration sequence. Thus, even during a period during which the active access control unit 12A, 12B performs multiple-line control, a new customer side device 3 can be appropriately allowed to participate in the PON.

In addition, in this case, the active access control unit 12A, 12B can certainly grasp which one of the PONs for the channels A and B the new customer side device 3 belongs to.

[Third Variant]

In the above-described embodiment, it is preferred that in upstream multiple access control according to MPCP, each of the access control units 12A and 12B for the channels A and B create only a grant for an allowed upstream frame whose transmission timing is before switching of both of the switches 11 and 14 by the fallback control unit 20.

More specifically, assuming the case in which the switches 11 and 14 are switched to centralize access control on the channel A side with the time of creating a grant being t1, the time of switching the switches 11 and 14 being t2, and the transmission timing of an upstream frame described in the grant being t3, the PON control unit 26 in the access control unit 12B which becomes standby in fallback mode does not create a grant in the case of timing t1<t2<t3, and creates a grant only in the case of timing t1<t3<t2.

The reason is as follows. Specifically, if the PON control unit 26 in the access control unit 12B which becomes standby in fallback mode creates a grant at timing t1<t2<t3, there is a possibility that an upstream frame based on a grant which is allowed by the PON control unit 26 before switching of the switches 11 and 14 may reach the station side device 2 after switching of the switches 11 and 14, and may collide with another upstream frame granted in the past by the PON control unit 26 in the active access control unit 12A.

In this regard, when the PON control unit 26 in the access control unit 12B which becomes standby in fallback mode creates a grant only at timing t1<t3<t2, upstream transmission collisions such as that described above caused by the switching to fallback mode can be avoided, enabling to appropriately perform a transition to fallback mode.

[Fourth Variant]

In the above-described embodiment, it is preferred that when performing multiple-line control, the PON control unit 26 in the access control unit 12A, 12B which becomes active in fallback mode schedule upstream frames allowed for the customer side devices 3 belonging to the same PON line 4A, 4B, such that the transmission timings of the upstream frames are consecutive as much as possible.

Figure 6:
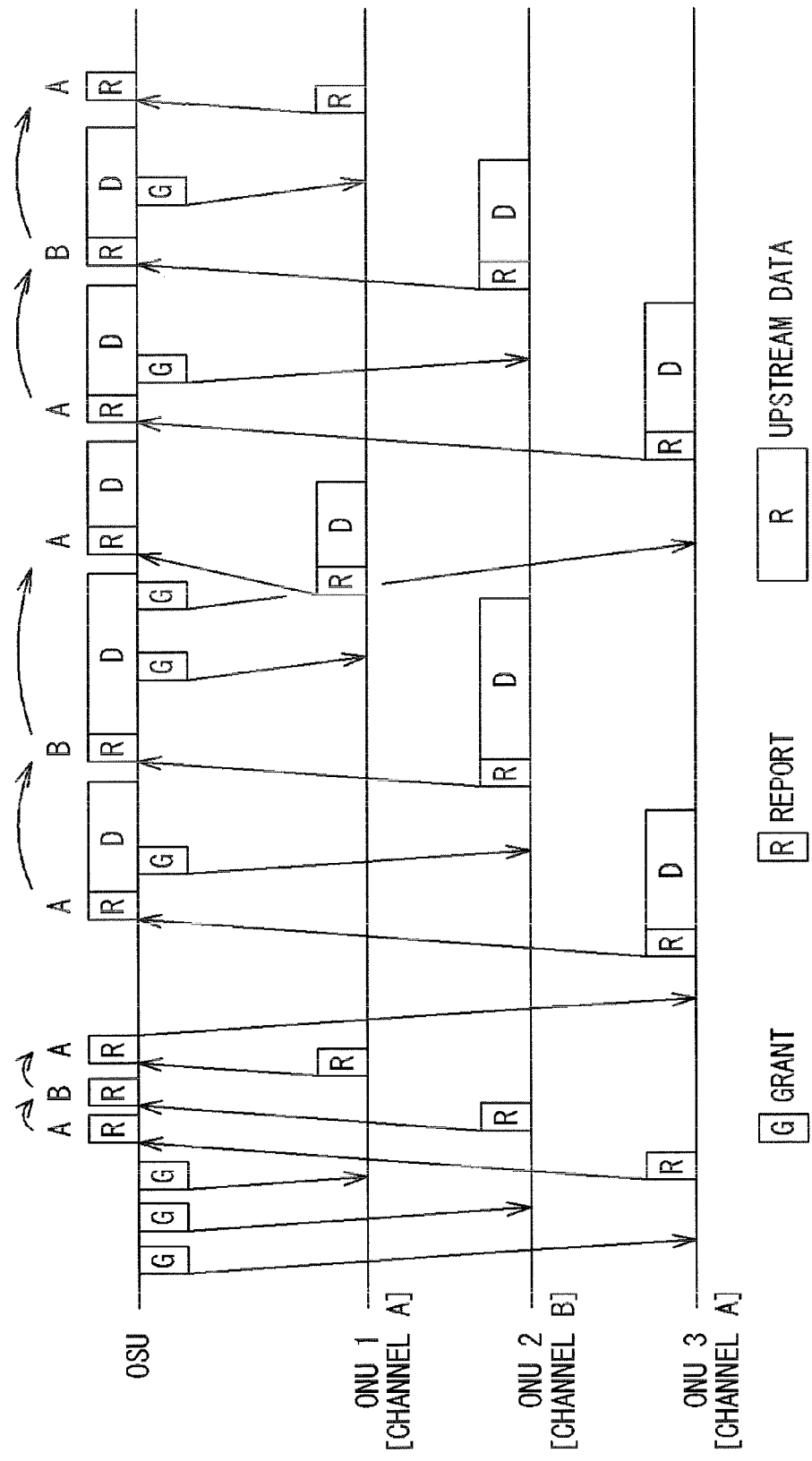
FIG. 6 is a sequence diagram showing an example of upstream bandwidth allocation by an active access control unit.
Figure 7:
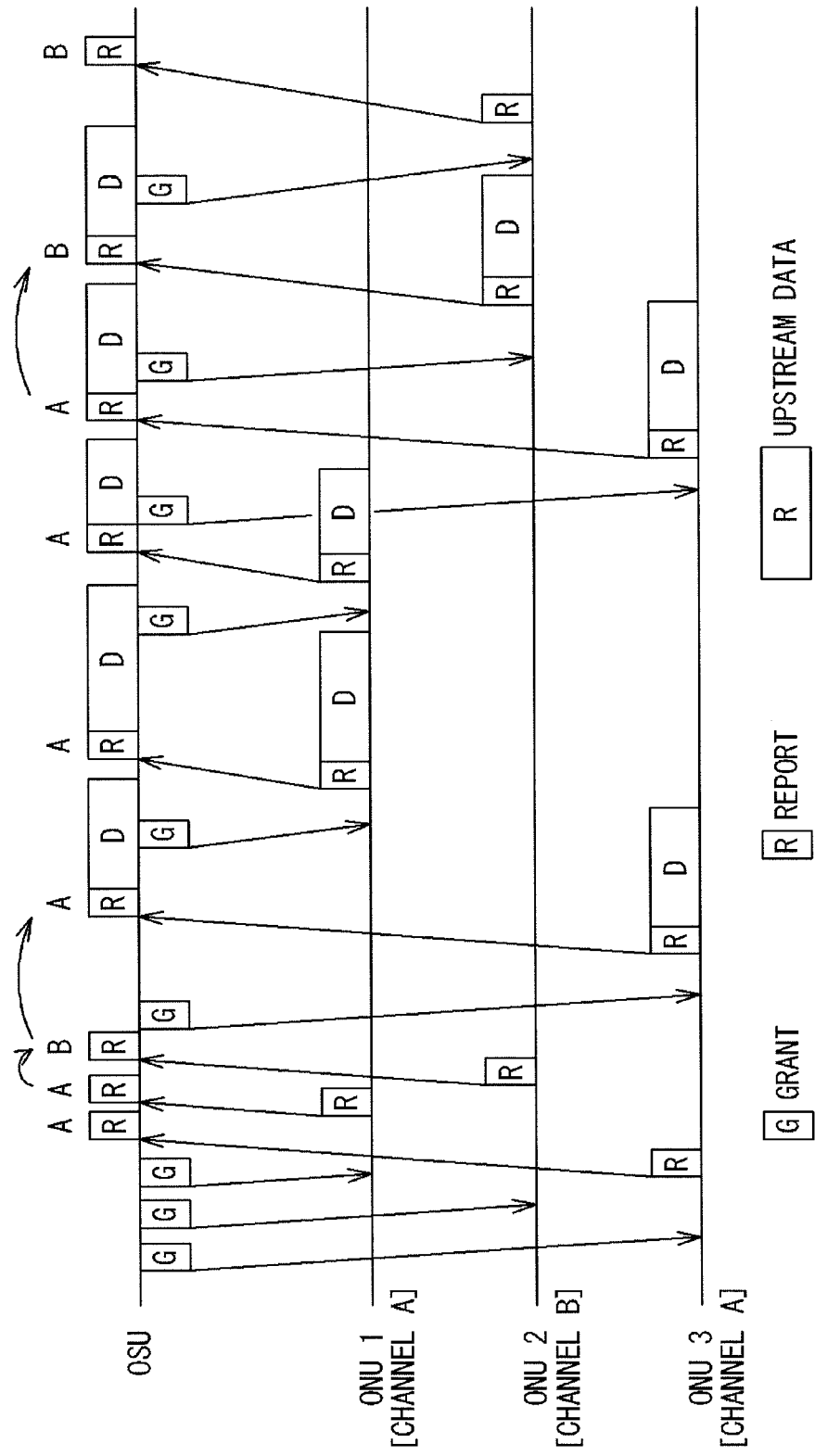
FIG. 7 is a sequence diagram showing another example of upstream bandwidth allocation by an active access control unit.

FIGS. 6 and 7 are sequence diagrams for showing the effects of the above-described scheduling. FIG. 6 shows the case in which the active access control unit 12A, 12B schedules upstream frames regardless of the channels A and B for ONUs. FIG. 7 shows the case in which the active access control unit 12A, 12B schedules upstream frames such that upstream frames for the same channel A, B are consecutive.

Note that in FIGS. 6 and 7 it is assumed that ONU 1 and ONU 3 belong to the PON line 4A for the channel A, and ONU 2 belongs to the PON line 4B for the channel B.

In the example shown in FIG. 6, the OSU schedules upstream frames such that the ONUs 1 to 3 perform upstream transmission in the order of the ONU 1 (channel A)→the ONU 2 (channel B)→the ONU 3 (channel A).

In this case, as shown at the top of FIG. 6, the channel types of reports or reports with data which are received by the OSU from the ONUs 1 to 3 are arranged as follows: A→B→A→A→B→A→A→B→A. The channel type is switched six times in total.

Therefore, in the scheduling shown in FIG. 6, when receiving a total of nine upstream frames, switching of the lower switch 14 needs to be performed as much as six times.

However, in scheduling where the lower switch 14 is thus frequently switched, when the temporal overhead for switching of the lower switch 14 is not small, the upstream bandwidth is wastefully suppressed.

On the other hand, in the example shown in FIG. 7, the OSU schedules upstream frames such that the ONUs 1 to 3 perform upstream transmission in the order of the ONU 1 (channel A)→the ONU 3 (channel A)→the ONU 2 (channel B), i.e., such that upstream transmission timings for the channel A belonging to the PON line 4A are consecutive.

In this case, as shown at the top of FIG. 7, the channel types of reports or reports with data which are received by the OSU from the ONUs 1 to 3 are arranged as follows: A→A→B→A→A→A→A→B→B. The channel type is switched three times in total.

Therefore, in the scheduling shown in FIG. 7, when receiving a total of nine upstream frames, switching of the lower switch 14 only needs to be performed three times.

By thus making the transmission timings of upstream frames allowed for the customer side devices 3 belonging to the same PON line 4A, 4B consecutive, compared to the case of randomly scheduling upstream frames without taking it into account, the number of switchings of the lower switch 14 during a predetermined period of time can be reduced. Hence, there is an advantage in being able to reduce upstream bandwidth loss caused by the switching of the lower switch 14.

[Fifth Variant]

Figure 8:
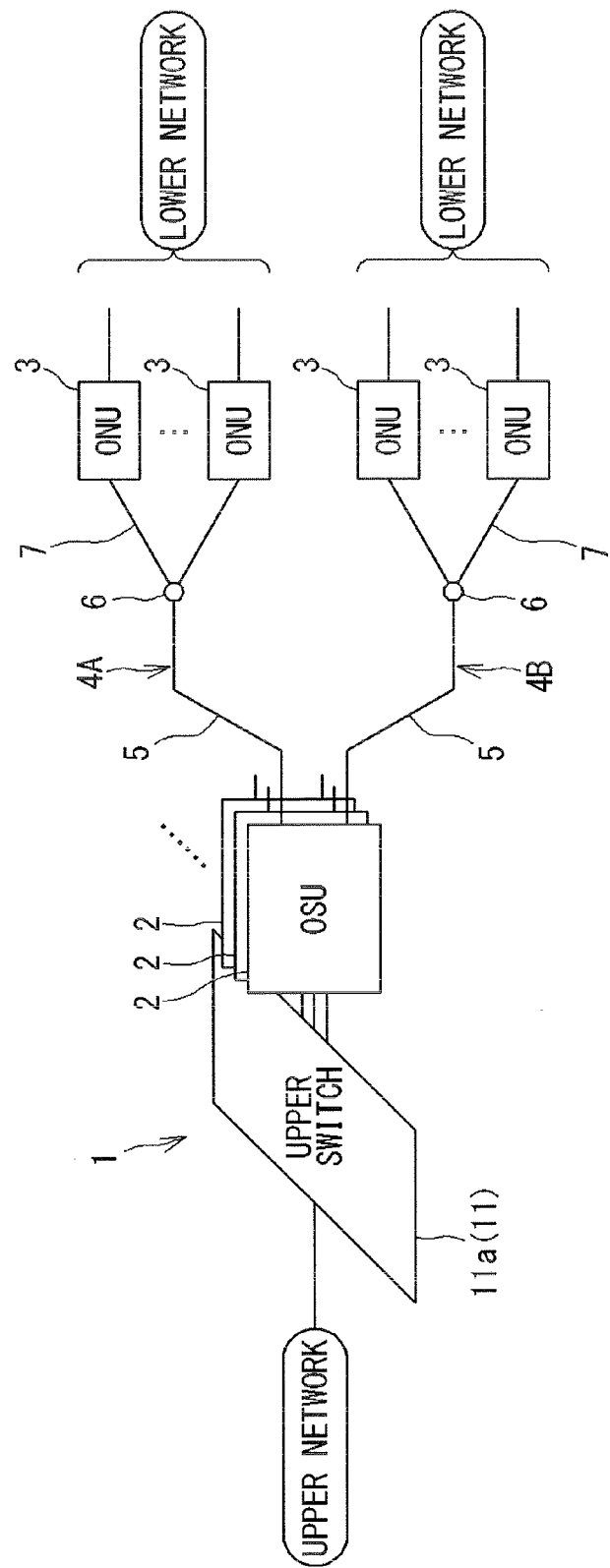
FIG. 8 is a diagram showing a connection mode of a PON system for showing a variant of an upper switch.

Although in the above-described embodiment the case in which each of the OSUs 2 composing the OLT 1 has an upper switch 11 is exemplified, for example, as shown in FIG. 8, the upper switch 11 may be configured by a redundant line concentrator 11a which multiplexes the upper sides of the OSUs 2.

In this case, when the line concentrator 11a is allowed to perform all functions of the upper switch 11, the upper switch 11 becomes unnecessary on a mounted board of the OSU 2. Of course, the functions of the upper switch 11 may be shared between the line concentrator 11a and the mounted board of the OSU 2.

[Sixth Variant]

Figure 9:
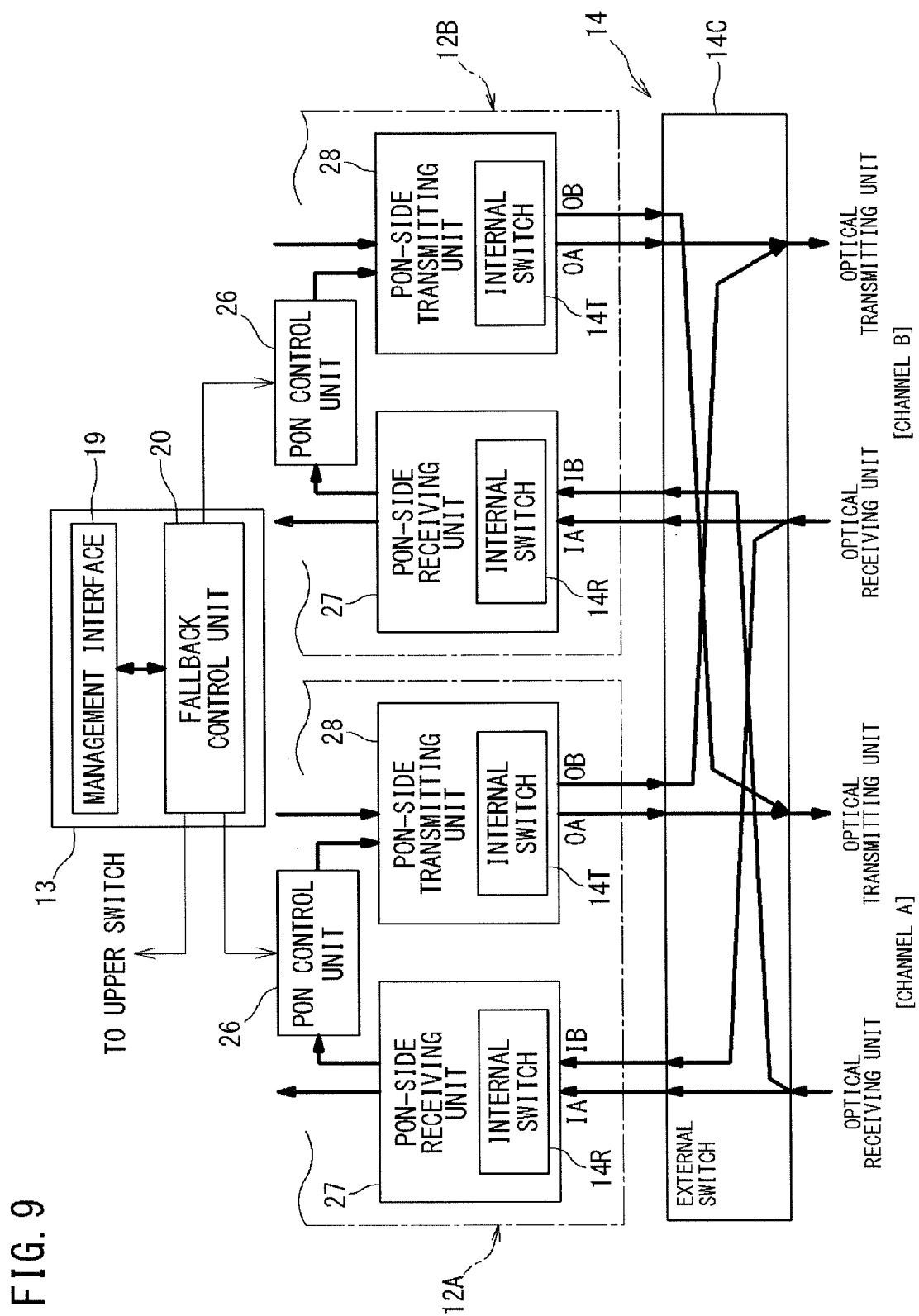
FIG. 9 is a block diagram for showing a variant of a lower switch.

In the above-described embodiment, some of the functions of the lower switch 14 may be incorporated in the access control units 12A and 12B. FIG. 9 is a block diagram showing an implementation example thereof.

As shown in FIG. 9, a lower switch 14 of this variant is composed of internal switches 14R and 14T incorporated in PON-side receiving units 27 and PON-side transmitting units 28 in access control units 12A and 12B, respectively; and an external switch 14C provided external to the access control units 12A and 12B.

Each of the internal switches 14R on the receiver side has an input port IA for the channel A and an input port IB for the channel B. Each of the internal switches 14T on the transmitter side has an output port OA for the channel A and an output port OB for the channel B.

In addition, the external switch 14C has, as upper-side ports, two output ports for two input ports IA and IB of each internal switch 14R, and two input ports for two output ports OA and OB of each internal switch 14T.

PON control units 26 for the channels A and B perform upstream multiple access control which is either normal line control or multiple-line control, in response to an instruction from a fallback control unit 20. Here, taking a look at the access control unit 12A for the channel A, when the channel A is subjected to normal line control, a PON-side transmitting unit 28 in the control unit 12A inputs downstream data to a corresponding port of the external switch 14C only from the output port OA of the internal switch 14T.

In addition, when the channel A is subjected to multiple-line control, the PON-side transmitting unit 28 in the access control unit 12A inputs downstream data to corresponding ports of the external switch 14C from both of the ports OA and OB of the internal switch 14T.

On the other hand, when the channel A is subjected to normal line control, the external switch 14C inputs upstream data received from an optical receiving unit 30 for the channel A, to the input port IA of the internal switch 14R in the PON-side receiving unit 27.

In addition, when the channel A is subjected to multiple-line control, the external switch 14C inputs upstream data received from the optical receiving unit 30 for the channel A, to the input port IA of the internal switch 14R in the PON-side receiving unit 27, and inputs upstream data received from an optical receiving unit 30 for the channel B, to the input port IB of the internal switch 14R in the PON-side receiving unit 27.

Then, the PON control unit 26 for the channel A performs time-division multiplexing control on the upstream data inputted from the input ports IA and IB of the internal switch 14R, such that the reception processes for the upstream data by the PON-side receiving unit 27 do not compete with each other. The access control unit 12B for the channel B also performs the same processes as those for the case of the channel A.

Note that in the variant of FIG. 9, each internal switch 14T on the transmitter side may have one port, and in the case of multiple-line control, downstream data may be copied.

As shown in the variant in FIG. 9, the process of sorting communication data for the channels A and B (route selection) in the case of switching the operating mode of the station side device 2 may be performed by the external switch 14C, and time-division multiplexing for upstream data for both of the channels A and B which requires in the case of multiple-line control may be performed by the internal switches 14R provided in the access control units 12A and 12B.

[Other Variants]

The embodiment (including the above-described variants) disclosed herein is in all respects as illustrative and not restrictive. The scope of right of the present invention includes all changes which come within the range of equivalency of the configurations recited in the claims, but not the above-described embodiment.

For example, although in the above-described embodiment the access control units 12A and 12B for both of the channels A and B can perform multiple-line control, for example, only one access control unit 12A may be able to perform multiple-line control, and the other access control unit 12B may perform only normal line control.

In this case, since only the access control unit 12A performs multiple-line control, the access control unit 12A does not become standby in fallback mode.

Therefore, though an update to computer programs cannot be performed with the access control unit 12A made standby, power consumption can be reduced by stopping or suppressing power supply to the access control unit 12B. Thus, there is a certain effect when fallback mode is used to reduce power consumption.

Although in the above-described embodiment the two-channel PON lines 4A and 4B are connected to the station side device 2, and a pair of the access control unit 12A, 12B and the optical transmitting and receiving unit 16A, 16B is provided for each of the two channels A and B, they may be three or more channels.

For example, in the case of a station side device 2 having three-channel (channels A to C) PON lines 4A to 4C, various fallback configurations can be defined, e.g., a fallback configuration in which an optical transmitting and receiving unit 16C for the channel C is allowed to belong to access control units 12A and 12B for the channels A and B in a distributed manner to place the access control unit 12C in a non-communication state, and a fallback configuration in which optical transmitting and receiving units 16B and 16C for the channels B and C are allowed to belong to an access control unit 12A for the channel A to simultaneously place the access control units 12B and 12C in a non-communication state.

Assuming the station side device 2 that controls the PON lines 4A to 4C for three or more channels in the above-described manner, there may be a plurality of "first" PON lines, "first" access control units, and "first" optical transmitting and receiving units recited in the claims, which become active in the case of fallback mode. In addition, likewise, there may be a plurality of "second" PON lines, "second" access control units, and "second" optical transmitting and receiving units recited in the claims, which become standby in the case of fallback mode.

REFERENCE SIGNS LIST

1: OPTICAL LINE TERMINAL (OLT)
2: OPTICAL LINE TERMINAL (OSU)
3: OPTICAL NETWORK UNIT (ONU)
4A: PON LINE
4B: PON LINE
11: UPPER SWITCH
12A: ACCESS CONTROL UNIT
12B: ACCESS CONTROL UNIT
14: LOWER SWITCH
15: OPTICAL TRANSMISSION AND RECEPTION CONTROL UNIT
16A: OPTICAL TRANSMITTING AND RECEIVING UNIT
16B: OPTICAL TRANSMITTING AND RECEIVING UNIT
19: MANAGEMENT INTERFACE
20: FALLBACK CONTROL UNIT
25: MANAGEMENT TABLE
26: PON CONTROL UNIT

The invention claimed is:

1. A station side device that configures a PON system with a plurality of customer side devices, the station side device comprising:
   a first optical transmitting and receiving unit, comprising a first optical transceiver, connectable to a first PON line;
   a second optical transmitting and receiving unit, comprising a second optical transceiver, connectable to a second PON line;
   a first processor of a first access control unit that is programmed to perform normal line control and multiple-line control, the normal line control being upstream multiple access control for the first PON line, and the multiple-line control being the upstream multiple access control for the first and second PON lines;
   a second processor of a second access control unit that is programmed to perform normal line control, the normal line control being the upstream multiple access control for the second PON line;

an upper switch provided on an upper side of both of the access control units;

a lower switch provided between both of the access control units and both of the optical transmitting and receiving units; and a third processor of a fallback control unit that is programmed to switch both of the switches in a manner shown in following (a) and (b):

(a) output destinations of downstream frames to the first and second PON lines inputted to the upper switch are aggregated into the first access control unit, and output destinations of the downstream frames inputted from the first access control unit to the lower switch are distributed to the first and second optical transmitting and receiving units; and (b) output destinations of upstream frames inputted from the first and second optical transmitting and receiving units to the lower switch are aggregated into the first access control unit.

2. The station side device according to claim 1, wherein the fallback control unit can further switch both of the switches in a manner shown in following (c) and (d):

(c) output destinations of downstream frames to the first and second PON lines inputted to the upper switch are distributed to the first and second access control units, and output destinations of the downstream frames inputted from the first and second access control units to the lower switch are set to the first and second optical transmitting and receiving units, respectively; and (d) output destinations of upstream frames inputted from the first and second optical transmitting and receiving units to the lower switch are set to the first and second access control units, respectively.

3. The station side device according to claim 1, wherein the first access control unit includes memory that stores a management table having logical link identifiers for the first PON line and logical link identifiers for the second PON line such that values of the logical link identifiers for the first PON line and those of the second PON line do not overlap, and performs the multiple-line control using the logical link identifiers held in the management table.

4. The station side device according to claim 3, wherein the first access control unit obtains information required to maintain logical links from the second access control unit and holds the information in advance in the management table for each logical link identifier, and performs the multiple-line control using the held information.

5. The station side device according to claim 4, wherein the first access control unit performs the multiple-line control using a clock that synchronizes with the second access control unit.

6. The station side device according to claim 4, wherein the first access control unit performs the multiple-line control using a time stamp whose difference from a time stamp used by the second access control unit has a predetermined value or less.

7. The station side device according to claim 1, wherein the first and second access control units cancel registration of logical link identifiers whose control subject of the upstream multiple access control changes, around time of switching of both of the switches by the fallback control unit.

8. The station side device according to claim 1, wherein in the multiple-line control the first access control unit performs a registration sequence of the customer side devices such that an input source of upstream frames in the lower switch is fixed to either one of the first and second optical transmitting and receiving units for each discovery process.

9. The station side device according to claim 1, wherein the first and second access control units create only a grant for an allowed upstream frame whose transmission timing is before switching of both of the switches by the fallback control unit.

10. The station side device according to claim 1, wherein in the multiple-line control the first access control unit schedules upstream frames allowed for customer side devices belonging to a same PON line, such that transmission timings of the upstream frames are consecutive.

* * * * *